United States Patent [19]

Crass et al.

[11] Patent Number: 4,652,489
[45] Date of Patent: Mar. 24, 1987

[54] SEALABLE, OPAQUE POLYOLEFINIC MULTILAYER FILM AND PROCESS THEREFOR

[75] Inventors: Günther Crass, Taunusstein; Siegfried Janocha, Wiesbaden; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 804,890

[22] Filed: Dec. 5, 1985

[30] Foreign Application Priority Data

Dec. 8, 1984 [DE] Fed. Rep. of Germany ....... 3444866

[51] Int. Cl.$^4$ .............................................. B32B 7/02
[52] U.S. Cl. .................................... 428/337; 428/349; 428/447; 428/516; 428/910; 428/35; 427/39; 264/290.2; 156/244.17; 156/244.14; 525/240
[58] Field of Search ................. 428/349, 516, 910, 35, 428/447, 337; 525/240; 156/244.17, 244.14; 264/290.2; 427/39

[56] References Cited

U.S. PATENT DOCUMENTS

| | | | |
|---|---|---|---|
| 4,230,767 | 10/1980 | Isaka et al. | 428/349 |
| 4,293,608 | 10/1981 | Isaka et al. | 428/349 |
| 4,303,708 | 12/1981 | Gebhardt et al. | 428/349 |
| 4,340,641 | 7/1982 | Weiner | 428/349 |
| 4,348,457 | 9/1982 | Rosenthal et al. | 428/349 |
| 4,502,263 | 3/1985 | Crass et al. | 428/516 |

*Primary Examiner*—Edith Buffalow
*Attorney, Agent, or Firm*—Schwartz, Jeffery, Schwaab, Mack, Blumenthal & Evans

[57] ABSTRACT

A sealable, opaque polyolefinic multilayer film composed of a polypropylene base layer, a non-sealable surface layer, and a sealable surface layer, and process therefor. The sealable surface layer has a low minimum sealing temperature and is made from a copolymer of propylene and ethylene or butene-1 units and/or a terpolymer of ethylene, propylene and butene-1 units. The non-sealable layer is a combination of a propylene homopolymer and a slip agent. The base layer contains an additive which is incompatible with polypropylene. The process includes stretching of the film, and during the stretching step, the polymer matrix is torn open around the additive particles to form vacuoles which give the base layer a degree of opacity.

20 Claims, No Drawings

SEALABLE, OPAQUE POLYOLEFINIC MULTILAYER FILM AND PROCESS THEREFOR

BACKGROUND OF THE INVENTION

The present invention relates to a sealable, opaque multilayer film which is composed of a base or support layer comprising a propylene polymer and a sealable surface layer having a low minimum sealing temperature.

Films of this kind are used as packaging films in high-speed packaging machines, for example, in horizontal forming, filling and sealing machines. In the packaging process, the film which enters into the machine as a flat web is bent about its longitudinal axis so as to wrap the product to be packaged and is shaped into a tubular casing. The sealable surface layer forms the inside of the tubing. The edge zones of the film are placed one on top of the other in such a way that inside is in contact with inside. By the application of heat, a strip-shaped sealed seam (fin seal) is then produced, which projects from the tubular package and extends parallel to the longitudinal axis of the tubing. For portioning the product which has been filled in and forming individual packages, sealed seams are produced which extend, in mutually spaced arrangement, transversely to the longitudinal axis of the tubing and the tubular casing is severed in the region of these transverse seams transversely to the longitudinal axis of the casing.

It has been found that customary polypropylene-based films are hardly suitable for this application. Especially in modern, high-speed forming, filling and sealing machines, in which the film is conveyed in the horizontal direction at a speed exceeding 40 m/min, machine runability and slip properties of the film must be particularly good.

The sealable, opaque polyolefinic multilayer film according to published European Patent Application No. 0 114 311, on which the present invention is based, is formed of a base layer comprising a propylene polymer and at least one sealable layer comprising a polyolefin resin, a low molecular-weight resin which is compatible with the polyolefin resin, a propylene homopolymer and a polydiorganosiloxane. It is also intended for use as a packaging film in horizontal forming, filling and sealing machines and actually shows good processing characteristics in high-speed packaging machines.

It has been found, however, that the machine runability and slip properties of this film are only good when it is used in the unprinted state. It is frequently required to apply a printing to the packaging film. In these cases, the film must be subjected to a corona discharge treatment to render it printable. By this treatment, the surface tension of the film is increased and adhesion between film surface and printing ink is thus improved. This pretreatment has, however, the great disadvantage that this film loses its good running characteristics in high-speed packaging machines.

SUMMARY OF THE INVENTION

It is accordingly an object of the present invention to provide a sealable, opaque polyolefinic multilayer film having good processing characteristics in high-speed packaging machines, particularly in horizontal forming, filling and sealing machines.

It is another object of the invention to provide a multilayer film, as above, in which good processing characteristics are maintained, even when the film is corona-treated in order to improve its printability.

These objects are achieved by a sealable, opaque polyolefinic multilayer film comprising a polypropylene base layer including an additive incompatible with the polypropylene; a sealable surface layer selected from the group consisting of a copolymer of propylene and ethylene, a copolymer of propylene and butene-1, a terpolymer of ethylene, propylene and butene-1 and combinations of the above; and a non-sealable surface layer comprising from about 97.5% to about 99.7% by weight of a propylene homopolymer, and from about 0.3% to about 2.5% by weight of a slip agent, wherein the density of the multilayer film is no greater than about 0.85 g/cm$^3$, and wherein the sealable surface layer has a low minimum sealing temperature.

The objects of the invention are also achieved by a process for preparing the above sealable, opaque polyolefinic multilayer film, comprising the steps of coextruding a base layer and a separate surface layer on each side of the base layer to form the multilayer film, one of the surface layers being sealable and the other being non-sealable; biaxially stretching the multilayer film in longitudinal and transverse direction; and subjecting the non-sealable surface layer to a corona discharge treatment.

DETAILED DESCRIPTION OF THE PREFERRED EMBODIMENTS

Contrary to the multilayer film according to European Patent Application No. 0 114 311, the multilayer film of the present invention has only one sealable surface layer, while the other surface layer comprises the polymer forming the base layer. When this non-sealable surface layer is corona-treated, the adverse changes of the film observed in the corona-treatment of sealable surface layers surprisingly do not occur.

It has moreover unexpectedly been found, that a film of only two layers comprising a base layer and a single sealable surface layer does not yield the result which is intended to be achieved by the present invention, when the non-sealable film surface, i.e., the base layer in this specific case, is corona-treated in analogy with the present invention and the base layer contains the same additives as the non-sealable surface layer according to the present invention. With respect to machine runability, slip properties and gloss, this film is clearly inferior to the three-layer film of the present invention.

The propylene polymer forming the base layer of the multilayer film comprises a polymer which is customarily used for this purpose, for example, a homopolymer, particularly an isotactic polypropylene comprising a proportion which is soluble in n-heptane of maximally 15% by weight or a copolymer of propylene with ethylene or $C_4$ to $C_8$ α-olefins, comprising a propylene proportion of at least about 90% by weight. The propylene polymer of the base layer appropriately has a melt flow index ranging from about 0.5 to about 8 g/10 min., particularly from about 1.5 to about 4 g/10 min. at 230° C. and under a load of 21.18N (DIN 53 735) and a melting point of at least about 140° C., preferably about 150° C. or higher. The non-sealable surface layer also comprises the propylene homopolymer forming the base layer. Moreover, the sealable surface layer may contain propylene homopolymer as an additive. In addition to the propylene polymer, the base layer may contain an antistatic agent. Particularly suitable antistatic agents include long chain, aliphatic tertiary amines, in which the aliphatic radical has a carbon chain length from $C_{12}$ to $C_{18}$ and which are substituted by two hydroxyalkyl-($C_1$ to $C_4$) groups. These antistatic agents are, for example, described in U.S. Pat. No. 4,230,767. An addition ranging from about 0.1% to about 0.4% by weight is sufficient. N,N-bis-(2-hydroxyethyl)-($C_{12}$ to $C_{18}$)-alkyl amines are particularly preferred. Further additives which are included in the base layer to improve the slip properties do not yield practically any additional effect as far as the machine runability of the multilayer film is concerned.

The base layer contains an additive which is incompatible with the polymer, in particular, inorganic particles, such as calcium carbonate, silicon dioxide and/or a Na-Al-silicate. These particles usually have an average particle diameter of from about 2 to about 8 μm. However, an organic incompatible additive, preferably polystyrene, polymethyl methacrylate, polytetrafluoroethylene and/or a copolymer of these compounds may equally advantageously be included in the base layer in a dispersed state. The incompatible additive is appropriately used in a concentration of from about 5% to about 30% by weight, particularly from about 10% to about 20% by weight, relative to the base layer.

In this connection, "incompatible" signifies that the polymeric organic component has a melting point and/or a natural stretching ratio, which differ from the melting point and the natural stretching ratio of the polypropylene and that the polymer matrix is torn open in the stretching process and, as a result, vacuoles are formed.

Due to longitudinal stretching at temperatures of about 110° to about 125° C., which are approximately 10° to 20° C. below the temperatures customarily used during roll stretching in the longitudinal direction of oriented polypropylene films, a vacuole structure is produced, which leads to the pearlescent luster of the film surface. In the process, the specific gravity of the multilayer film must drop to less than about 90%, preferably to between about 50 and about 80%, of the specific gravity of the multilayer film before stretching and then reaches values equal to or below 0.85 g/cm$^3$, particularly values ranging from about 0.5 to about 0.8 g/cm$^3$.

The attractive pearlescent luster is achieved by the vacuole production (tearing open of the polymer matrix at the grain boundaries of the incompatible organic or inorganic additives in the base layer) upon longitudinally stretching and by the low molecular weight resin added to the sealing layer.

Coating of the base layer with the sealing layer is normally effected by coextrusion, the optimum layer thickness of the sealing layer(s) determined in the final film being in the range of from about 0.8 to about 1.0 μm, in each case. Greater thicknesses of the sealing layer(s) lead to deterioration of the processing behavior in high speed packaging machines.

Extrusion and transverse stretching are carried out under the customary process conditions for polypropylene films.

As the multilayer film is to be used in forming, filling and sealing machines, the minimum sealing temperature should be relatively low and should not exceed about 100° C. The minimum sealing temperature is the sealing temperature at which the strength of the sealed seam attains a value of about 0.5N per 15 mm strip width.

To determine the strength of the sealed seam, two superimposed films are heat sealed using two smooth heated sealer jaws (20×10 cm) of a customary heat sealing apparatus, under a pressure of 300 kPa over a period of 0.5 seconds. From the resulting sealed seam, 15 mm wide test strips are cut in the running direction of the film and transversely to the sealed seam and the force required to separate the films is determined, by recording the force-path diagram (peeling speed 200 mm/min.).

A polyolefin resin which is suitable for use in a sealable surface layer of this kind comprises a copolymer of propylene and ethylene units or of propylene and butene-1 units. Suitable copolymers formed of ethylene and propylene units contain from about 3% to about 10% by weight of ethylene units, copolymers of propylene and butene-1 units contain from about 5% to about 40% by weight of butene-1 units. Polyolefin resins which are additionally suitable for use in the sealable surface layer comprise terpolymers of ethylene, propylene, and butene-1 units containing a proportion of at least about 80% by weight of propylene units. The sealable surface layer has a melting point of at least about 130° C., the melt flow index of the polyolefin resin of the sealable surface layer is in the range of from about 1 to about 16 g/10 min. at 230° C. and under a load of 21.18N (DIN 53 735).

Mixtures of the indicated copolymers and terpolymers, especially a mixture of a $C_3/C_4$-copolymer and a $C_2/C_3/C_4$-terpolymer are particularly advantageously employed, as has already been described in published European Patent Application No. 0 114 311. Highly preferred are mixtures of an ethylene-propylene-butene-1 terpolymer and a propylene-butene-1 copolymer, corresponding to a content of from about 0.1% to about 7% by weight of ethylene, from about 53% to about 89.9% by weight of propylene and from about 10% to about 40% by weight of butene-1. Particularly when using this specific polymer mixture for the sealable surface layer, it has unexpectedly been found that customary additions of slip agents (polydiorganosiloxane) and/or anti-blocking agents (silicates) are no longer required in the sealable layer.

To improve the optical properties, in particular gloss, and reduce the sensitivity to scratching of the multilayer film, from about 5 to about 15% by weight, based on the sealable surface layer, of a low molecular weight thermoplastic resin which is compatible with the sealable polyolefin resin and has a softening point in the range from about 60° to about 180° C., particularly from about 80° to about 130° C. (DIN 1995-U4), is appropriately used in the sealable surface layer, as is known per se. Examples of these resins comprise hydrocarbon resins, ketonic resins, polyamide resins, colophony, dammar resins and chlorinated aliphatic and aromatic hydrocarbon resins. The addition of these resins to a polyolefinic sealable surface layer is described in European Patent Application No. 0 114 311.

It is further possible to improve optical properties, particularly the gloss effect, scratch resistance and also machine runability by adding from about 5% to about 15% by weight of a propylene homopolymer to the sealable surface layer. Suitable propylene homopolymers are identical to those described above for use in the base layer. The melting point of the polypropylene is above the melting point of the polyolefin resin of the sealable surface layer.

According to the present invention, it is essential that a second, non-sealable surface layer is present and that—contrary to the sealable layer and the base layer—this layer contains a slip agent. It has surprisingly been found that the machine runability as well as the optical effect (gloss) of the multilayer film are clearly improved when the slip agent is not contained in the sealable layer, but is exclusively present in the non-sealable layer.

For the most part, the non-sealable surface layer comprises a propylene homopolymer and it preferably contains small amounts of a polydiorganosiloxane as a slip agent. While it is true that fatty acid amides used as slip agents may have a similar effect as far as machine runability is concerned, polydiorganosiloxane is, however, preferred since it does not adversely influence the optical properties of the film.

Particularly suitable propylene homopolymers have been discussed above in describing the base layer. For reasons of coextrusion technique it is, however, appropriate for the polypropylene of the non-sealable surface layer to have a melt flow index which is higher than the melt flow index of the polypropylene of the base layer.

The polydiorganosiloxane is used in a quantity of from about 0.3 to about 2.5% by weight, based on the non-sealable surface layer, and preferably comprises a polymethylphenlysiloxane or a polydimethylsiloxane, which particularly has a kinematic viscosity in the range of from about $10^3$ to about $10^6$, especially from about 20,000 to about 30,000 mm$^2$/s at 25° C.

The surface layers should have a thickness of less than about 3 μm, particularly less than about 1.2 μm, since greater layer thicknesses would impair the processing behavior of the film in high speed packaging machines. The biaxially stretched multilayer film preferably has a total thickness of from about 15 to about 60 μm, in particular from about 20 to about 40 μm.

To prepare the molding compounds used for the surface layers and join the molding compounds to the base layer, the customary method of melt extrusion is employed. In the coextrusion process, the stretching conditions required in manufacturing sealable, opaque polyolefinic multilayer films having a pearlescent luster are observed, as described, for example, in published European Patent Application No. 0 114 311 and in U.S. Pat. No. 4,303,708. Following stretching in the longitudinal and transverse directions, the non-sealable surface layer is subjected to a corona discharge treatment at the usual intensity. In the process, voltage and amperage are adjusted to the values required to obtain a surface tension of from about 36 to about 40 mN/m in a comparable film without the addition of a slip agent (polysiloxane addition).

Direct measurement of the surface tension of the film through its wettability by test liquids (DIN 53 364) is impossible in the presence of a polysiloxane.

The corona-treated non-sealable surface layer readily accepts printing ink. Suitable printing inks include one-component as well as two-component printing inks, which adhere excellently to this surface.

The invention is explained in detail by the following example. The measured values were determined according to the following measuring methods:

Melt Flow Index—DIN 53 735 at 230° C. and under a load of 21.18N
Softening Point—DIN 1935-U4 (Vicat-A)
Melting Point—DSC measurement, maximum of melting curve, rate of heating 20° C./min.

EXAMPLE

With the aid of the coextrusion process, a 1.3 mm thick multilayer film, the base of which was comprised of a propylene homopolymer having a melt flow index of 2 g/10 min. and containing 15% by weight, relative to the base layer, of calcium carbonate particles having an average particle diameter of about 3 μm, was extruded through a slot die having a width of 280 mm and a height of gap of 1.8 mm, at an extrusion temperature of 260° C. and a throughput of 70 kg/h. On either surface of the base layer a surface layer was present. After travelling through an air gap having a length of 20 mm this film was chilled on a chill roll at a temperature of 30° C., which had a diameter of 600 mm and rotated at a circumferential speed of 4.5 m/min. Thereafter, the film was passed on from the chill roll to a three-high roll arrangement which also had a temperature of 30° C. and rotated at a circumferential speed of 4.5 m/min. and after heating to 115° C. to 120° C., the film was longitudinally stretched by a factor of six by a further three-high roll arrangement. The film was then stretched ten times in the transverse direction at an air temperature of 175° C.

The multilayer film thus formed had a thickness of approximately 33 μm and a density of 0.70 g/cm$^3$. The non-sealable surface layer was rendered printable by means of a corona discharge treatment.

The sealable surface layer comprised:
(a) 80% by weight, based on the sealing layer, of an olefin resin composition comprising
  ($a_1$) 50% by weight of an ethylene-propylene-butylene terpolymer comprising 1.4% by weight of ethylene, 2.8% by weight of butylene and 95.8% by weight of propylene (in each case based on the terpolymer) and
  ($a_2$) 50% by weight of a propylene-butylene and copolymer comprising 66.8% by weight of propylene and 33.2% by weight of butylene (in each case based on the copolymer), corresponding to a content of 0.7% by weight of ethylene, 81.3% by weight of propylene and 18% by weight of butylene. The olefin composition $a_1 + a_2$ had a melt flow index of 8 g/10 min. and a melting point of 150° C.;
(b) 10% by weight, based on the sealing layer, of Arkon®P 125 (a hydrogenated hydrocarbon resin having a softening point of 125° C.), as the resin which is compatible with the olefin resin composition;
(c) 10% by weight, based on the sealing layer, of a propylene homopolymer having a melting point of 162° C. (Hostalen®PPN 1060 F).

The non-sealable surface layer comprised:
(a) 99.2% by weight of an isotactic propylene homopolymer ($i_{21.18} = 3.5$ g/10 min) having a melting point of 162° C.,
(b) 0.8% by weight of a polydimethylsiloxane, kinematic viscosity 25,000 mm$^2$/s (25° C.).

The following table gives an evaluation of the multilayer film when used for its intended purpose in a horizontally operating forming, filling and sealing machine, compared with the multilayer film disclosed in European Patent Application No. 0 114 311.

Processing tests were carried out in a horizontally operating forming, filling and sealing machine.

|  | Packaging Speed | | |
|---|---|---|---|
|  | 10 m/min | 20 m/min | 40 m/min |
| Comparative Example 1 acc. to published European Patent Application No. 0 114 311 (unsuited for printing) | + | + | + |
| Comparative Example 2 acc. to published European Patent Application No. 0 114 311 (corona-treated, printable) | + | − | − |
| Example acc. to the present invention | + | + | + |

Classification of machine runability:
+ absolutely trouble-free operation of machine
− more than 3 interruption/10 min
− continuous passage of film impossible The foregoing description of preferred embodiments has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A sealable opaque polyolefinic multilayer film, comprising:
    a polypropylene base layer including an additive incompatible with said polypropylene;
    a sealable surface layer selected from the group consisting of a copolymer of propylene and ethylene, a copolymer of propylene and butene-1, a terpolymer of ethylene, propylene and butene-1, and combinations of the above; and
    a non-sealable surface layer comprising from about 97.5% to about 99.7% by weight of a propylene homopolymer, and from about 0.3% to about 2.5% by weight of a slip agent;
    wherein the density of said multilayer film is no greater than about 0.85 g/cm$^3$, and wherein said sealable surface layer has a low minimum sealing temperature.

2. A multilayer film as claimed in claim 1, wherein said slip agent is a polydiorganosiloxane.

3. A multilayer film as claimed in claim 2, wherein said polydiorganosiloxane is selected from the group consisting of polydialkylsiloxane and polyalkylphenylsiloxane.

4. A multilayer film as claimed in claim 3, wherein said polydiorganosiloxane is selected from the group consisting of a polydimethylsiloxane and a polymethylphenylsiloxane.

5. A multilayer film as claimed in claim 4, wherein said polydiorganosiloxane has a kinematic viscosity of from about $10^3$ to about $10^6$ mm/s at 25° C.

6. A multilayer film as claimed in claim 4, wherein said polydiorganosiloxane has a kinematic viscosity of from about 20,000 to about 30,000 mm$^2$/s at 25° C.

7. A multilayer film as claimed in claim 1, wherein said sealable surface layer further contains at least one additive selected from the group consisting of a low molecular weight resin and a propylene homopolymer, said resin being compatible with the copolymer or terpolymer of said sealable surface layer, each of said at least one additive present in an amount of from about 5% to about 15% by weight of said sealable surface layer.

8. A multilayer film as claimed in claim 1, wherein said sealable surface layer comprises an ethylene-propylene-butene-1 terpolymer and a propylene-butene-1 copolymer, corresponding to a content of from about 0.1% to about 7% by weight of ethylene, from about 53% to about 89.9% by weight of propylene and from about 10% to about 40% by weight of butene-1.

9. A multilayer film as claimed in claim 7, wherein said sealable surface layer comprises an ethylene-propylene-butene-1 terpolymer and a propylene-butene-1 copolymer, corresponding to a content of from about 0.1% to about 7% by weight of ethylene, from about 53% to about 89.9% by weight of propylene and from about 10% to about 40% by weight of butene-1.

10. A multilayer film as claimed in claim 7, wherein said low molecular weight resin has a softening point of from about 60° C. to about 180° C., and wherein said sealable surface layer has a sealing temperature of no greater than about 100° C.

11. A multilayer film as claimed in claim 1, wherein said non-sealable surface layer is corona-treated to improve its printability.

12. A multilayer film as claimed in claim 1, wherein said film is oriented by a biaxial stretching process.

13. A multilayer film as claimed in claim 1, wherein said incompatible additive is present in an amount of from about 5% to about 30% by weight.

14. A multilayer film as claimed in claim 1, wherein said incompatible additive is selected from the group consisting of calcium carbonate, silicon dioxide, a Na-Al-silicate, and combinations of the above.

15. A multilayer film as claimed in claim 1, wherein said incompatible additive is selected from the group consisting of polystyrene, polymethylmethacrylate, polytetrafluoroethylene, and copolymers of two or more of the above.

16. A multilayer film as claimed in claim 1, wherein said incompatible additive has an average particle diameter of from about 2 to about 8 $\mu$m.

17. A packaging film produced from the multilayer film of claim 1, wherein said surface layers have a thickness of less than about 3 $\mu$m.

18. A process for preparing a sealable, opaque polyolefinic multilayer film, comprising the steps of:
    coextruding a base layer and a separate surface layer on each side of said base layer to form the multilayer film, one of said surface layers being sealable and the other of said surface layers being non-sealable;
    biaxially stretching said multilayer film in longitudinal and transverse directions; and
    subjecting said non-sealable surface layer to a corona-discharge treatment;
    wherein said base layer is a polypropylene, and includes an additive which is incompatible with said polypropylene, said sealable surface layer is selected from the group consisting of a copolymer of propylene and ethylene, a copolymer of propylene and butene-1, a terpolymer of ethylene, propylene and butene-1, and combinations of the above, and said non-sealable surface layer comprises from about 97.5% to about 99.7% by weight of a propylene homopolymer, and from about 0.3% to about 2.5% by weight of a slip agent;

wherein the density of said multilayer film is no greater than about 0.85 g/cm³, and wherein said sealable surface layer has a low minimum sealing temperature.

19. A process as claimed in claim 13, wherein said corona-discharge treatment is performed at an intensity sufficient to obtain a surface tension equivalent to between about 36 and about 40 mN/m in a comparable surface layer lacking said slip agent.

20. A process as claimed in claim 13, wherein said biaxially stretched film has a thickness of from about 15 μm to about 60 μm.

* * * * *